US012754380B2

(12) United States Patent
Hinata

(10) Patent No.: US 12,754,380 B2
(45) Date of Patent: Oct. 6, 2026

(54) FERRULE, OPTICAL CONNECTOR, AND OPTICAL CONNECTOR MODULE

(71) Applicant: Enplas Corporation, Saitama (JP)

(72) Inventor: Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 378 days.

(21) Appl. No.: 18/470,498

(22) Filed: Sep. 20, 2023

(65) Prior Publication Data

US 2024/0103233 A1 Mar. 28, 2024

(30) Foreign Application Priority Data

Sep. 22, 2022 (JP) ................................ 2022-151839

(51) Int. Cl.
*G02B 6/36* (2006.01)
*G02B 6/38* (2006.01)
*G02B 6/40* (2006.01)

(52) U.S. Cl.
CPC .......... *G02B 6/3882* (2013.01); *G02B 6/403* (2013.01)

(58) Field of Classification Search
CPC .... G02B 6/3882; G02B 6/403; G02B 6/3839; G02B 6/32; G02B 6/3861; G02B 6/3885; G02B 6/36
See application file for complete search history.

(56) References Cited

U.S. PATENT DOCUMENTS 7,040,814 B2 * 5/2006 Morimoto ............ G02B 6/4201 385/88
2006/0245694 A1 11/2006 Chen et al.
2018/0335573 A1 * 11/2018 Wada .................. G02B 6/3882
2019/0265417 A1 8/2019 Nakama
2022/0019033 A1 * 1/2022 Nakama ............... G02B 6/3882
2022/0050250 A1 * 2/2022 Asada ...................... G02B 6/04

FOREIGN PATENT DOCUMENTS

CN 113900192 A 1/2022
JP 2008-535037 A 8/2008
JP 2016-045363 A 4/2016
JP 2016-095431 A 5/2016
JP 2018-092152 A 6/2018
JP 2020-008715 A 1/2020
JP 2020-098319 A 6/2020

* cited by examiner

*Primary Examiner* — Jennifer Doan
(74) *Attorney, Agent, or Firm* — Shih IP Law Group, PLLC

(57) ABSTRACT

A ferrule of the present invention includes a ferrule body including an optical transmission member holding part, the optical transmission member holding part being configured to hold a plurality of optical transmission members; and an optical transmissive member including an optical surface disposed opposite to front end surfaces of the plurality of optical transmission members held by the optical transmission member holding part, the optical transmissive member being configured to transmit light emitted from the plurality of optical transmission members. The ferrule body includes a first fitting part and a first coupling hole, the first coupling hole being configured to receive a coupling member. The optical transmissive member includes a second fitting part configured to be fitted with the first fitting part, and a second coupling hole through which the coupling member received by the first coupling hole is provided.

19 Claims, 12 Drawing Sheets

FERRULE, OPTICAL CONNECTOR, AND OPTICAL CONNECTOR MODULE

CROSS REFERENCE TO RELATED APPLICATIONS

This application is entitled to and claims the benefit of Japanese Patent Application No. 2022-151839, filed on Sep. 22, 2022, the disclosure of which including the specification, drawings and abstract is incorporated herein by reference in its entirety.

The present invention relates to a ferrule, an optical connector, and an optical connector module.

TECHNICAL FIELD

A ferrule that holds an optical transmission member (such as an optical fiber and an optical waveguide) is known. The ferrule holds the end portions of a plurality of optical transmission members, and the ferrules holding the end portions of the plurality of optical transmission members are connected to each other so that the front end surfaces of the optical transmission member are optically connected to each other.

As the above-described ferrules, ferrules each composed of two members are known. For example, PTL 1 discloses a ferrule structure (ferrule) composed of a ferrule body that holds an optical transmission member, and a lens plate (optical transmissive member) that transmits light from the optical transmission member or light that enters the optical transmission member. Both of the two members are molded resin products.

CITATION LIST

Patent Literature

PTL 1
Japanese Patent Application Laid-Open No. 2018-092152

SUMMARY OF INVENTION

Technical Problem

When using the above-described ferrule, it is necessary to couple the two members as one ferrule. In PTL 1, the two members are positioned by inserting a guide pin into a guide hole of the ferrule body and a guide hole of the lens plate (optical transmissive member).

Here, in an optical connector module using the ferrule disclosed in PTL 1, it is conceivable to couple the two members by using the guide pin (coupling member) and connect the two optical connector modules by additionally using a guide pin, for example. More specifically, in one optical connector module, the guide pin is shared by the ferrule body and the lens plate and further the front end of the guide pin is protruded from the lens plate, as a male optical connector module with a protruding structure. In the other optical connector module, the guide pin is shared by the ferrule body and the lens plate, and the front end of the guide pin is positioned at or near the middle portion of the guide hole of the lens plate, as a female with a recessed structure at the front surface. Then, it is conceivable to connect the optical connector modules with the male and female.

In such a configuration, however, the length of the pin of the male optical connector module is smaller than the thickness of the lens plate, and consequently the coupling strength of the optical connector modules is small.

An object of the present invention is to provide ferrules that can be connected to each other with a single shape and have a high coupling strength as an optical connector module. In addition, another object of the present invention is to provide an optical connector and an optical connector module including the ferrule.

Solution to Problem

[1] A ferrule including: a ferrule body including an optical transmission member holding part, the optical transmission member holding part being configured to hold a plurality of optical transmission members; and an optical transmissive member including an optical surface disposed opposite to front end surfaces of the plurality of optical transmission members held by the optical transmission member holding part, the optical transmissive member being configured to transmit light emitted from the plurality of optical transmission members or light that enters the plurality of optical transmission members, the ferrule body includes a first fitting part and a first coupling hole, the first coupling hole being configured to receive a coupling member, and the optical transmissive member includes a second fitting part configured to be fitted with the first fitting part, and a second coupling hole through which the coupling member received by the first coupling hole is provided.

[2] In the ferrule according to [1], the coupling member is a guide pin.

[3] In the ferrule according to [1] or [2], the first coupling hole includes at least two first coupling holes, the second coupling hole includes at least two second coupling holes, and the at least two second coupling holes are disposed on both sides with the optical surface sandwiched between the at least two second coupling holes.

[4] In the ferrule according to any one of [1] to [3], the optical transmission member holding part is a plurality of through holes.

[5] In the ferrule according to any one of [1] to [4], when surfaces facing each other of the ferrule body and the optical transmissive member are a first surface and a second surface, respectively when the first fitting part and the second fitting part are fitted with each other, a plurality of optical control surfaces configured to collimate light emitted from the plurality of optical transmission members or light that enters the plurality of optical transmission members is provided in the second surface.

[6] In the ferrule according to any one of [1] to [5], a plurality of optical control surfaces configured to collimate light emitted from the plurality of optical transmission members or light that enters the plurality of optical transmission members is provided in a third surface disposed on a side opposite to a surface that faces the ferrule body in the optical transmissive member when the optical transmissive member is disposed at the ferrule body.

[7] In the ferrule according to any one of [1] to [6], the first fitting part and the first coupling hole are coaxial, and the second fitting part and the second coupling hole are coaxial.

[8] In the ferrule according to any one of [1] to [7], an opening of the first coupling hole has a circular shape, and the second coupling hole has a cylindrical shape with a diameter greater than a diameter of the opening.

[9] In the ferrule according to any one of [1] to [8], the first fitting part is a recess, and the second fitting part is a protrusion.

[10] In the ferrule according to any one of [1] to [9], when an extending direction of the plurality of optical transmission members is a first direction, a direction in which the plurality of optical transmission members is disposed is a second direction, a direction perpendicular to the first direction and the second direction is a third direction, and surfaces facing each other of the ferrule body and the optical transmissive member when the first fitting part and the second fitting part are fitted with each other are a first surface and a second surface, respectively, the first surface and the second surface are tilted with respect to the third direction.

[11] In the ferrule according to any one of [1] to [10], when surfaces facing each other of the ferrule body and the optical transmissive member are a first surface and a second surface, respectively when the first fitting part and the second fitting part are fitted with each other, the second surface includes a first optical surface that is at least one recess disposed at a position opposite to the front end surfaces of the plurality of optical transmission members.

[12] In the ferrule according to any one of [1] to [11], the ferrule body and the optical transmissive member are fixed to each other with an adhesive.

[13] In the ferrule according to [11], the recess is filled with an adhesive.

[14] In the ferrule according to any one of [1] to [13], the first coupling hole is a through hole.

[15] An optical connector, the ferrule according to any one of [1] to [14]; and a plurality of optical transmission members.

[16] In the optical connector according to [15], further including a coupling member.

[17] In the optical connector according to [15], when a surface in the ferrule body that faces the optical transmissive member is a first surface when the first fitting part and the second fitting part are fitted with each other, a region around a given optical transmission member in the first surface and a front end surface of the given optical transmission member are connected to each other with no step.

[18] In the optical connector according to or [16], the first coupling hole includes two first coupling holes, the second coupling hole includes two second coupling holes, and the optical connector further comprises one coupling member.

[19] A female optical connector module, including the optical connector according to [15].

[20] A male optical connector module, including the optical connector according to [16].

Advantageous Effects of Invention

According to the present invention, it is possible to provide ferrules that can be connected to each other with a single shape, and have a high coupling strength. In addition, according to the present invention, it is possible to provide an optical connector and an optical connector module including the ferrule.

DESCRIPTION OF EMBODIMENTS

Embodiment 1

Optical Connector Module and Optical Connector

Figure 1A:
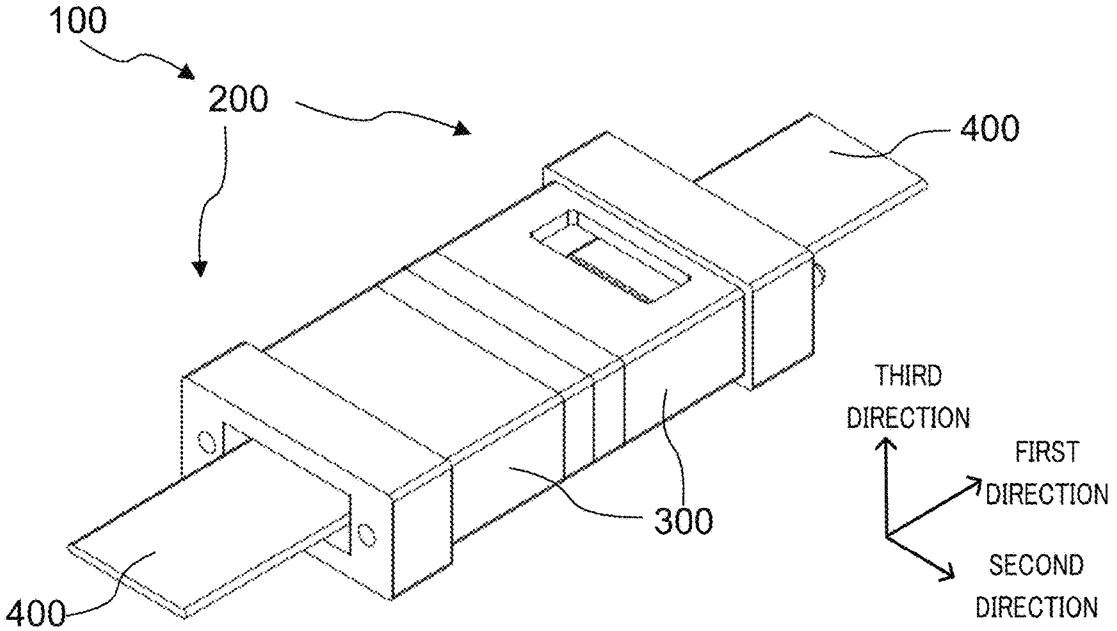
FIG. 1A is a perspective view of a state where two optical connectors according to Embodiment 1 are coupled with each other.

FIG. 1A illustrates an optical connector according to Embodiment 1 of the present invention in a connected state. Optical connector 200 may be provided as optical connector module 100 by being combined with a housing, a spring clamp structure and the like not illustrated in the drawing.

Figure 1B:
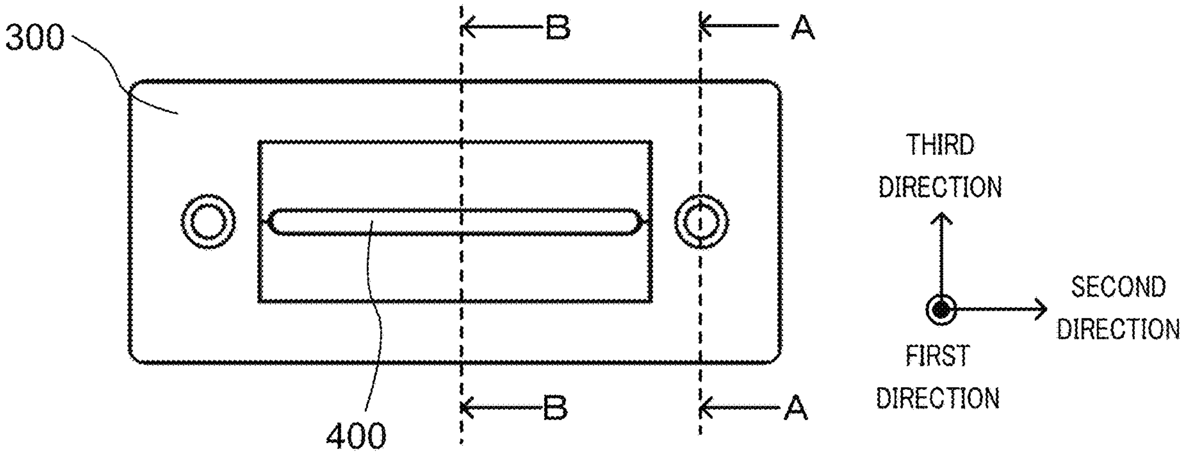
FIG. 1B is a rear view.

As illustrated in FIGS. 1A and 1B, two optical connectors 200 are connected to each other. Optical connector 200 includes ferrule 300 and optical transmission member 400. When optical connectors 200 are connected to each other at their front surfaces, optical transmission members 400 are optically connected. Note that ferrule 300, optical connector 200 and optical connector module 100 according to the present invention may be used not only for connecting optical transmission members 400, but also for connecting optical transmission member 400 and a photonic integrated circuit (PIC). In the case of connecting optical transmission member 400 and a photonic integrated circuit (PIC), it is preferable that the optical connector on the PIC side be an optical connector in which a ferrule body and a lens are integrated with each other rather than the ferrule of the present invention.

As illustrated in FIGS. 1A and 1B, the plurality of optical transmission members 400 are disposed side by side in a ribbon shape. In the following description, the extending direction of the plurality of optical transmission members 400 in plan view is the first direction, the arrangement direction of the plurality of optical transmission members 400 (the width direction of the ribbon) is the second direction, and the direction perpendicular to the first direction and the second direction is the third direction.

Note that it suffices that optical transmission member 400 can transmit light. Examples of optical transmission member 400 include optical fibers and optical waveguides. In the present embodiment, optical transmission member 400 is an optical fiber.

Figure 2A:
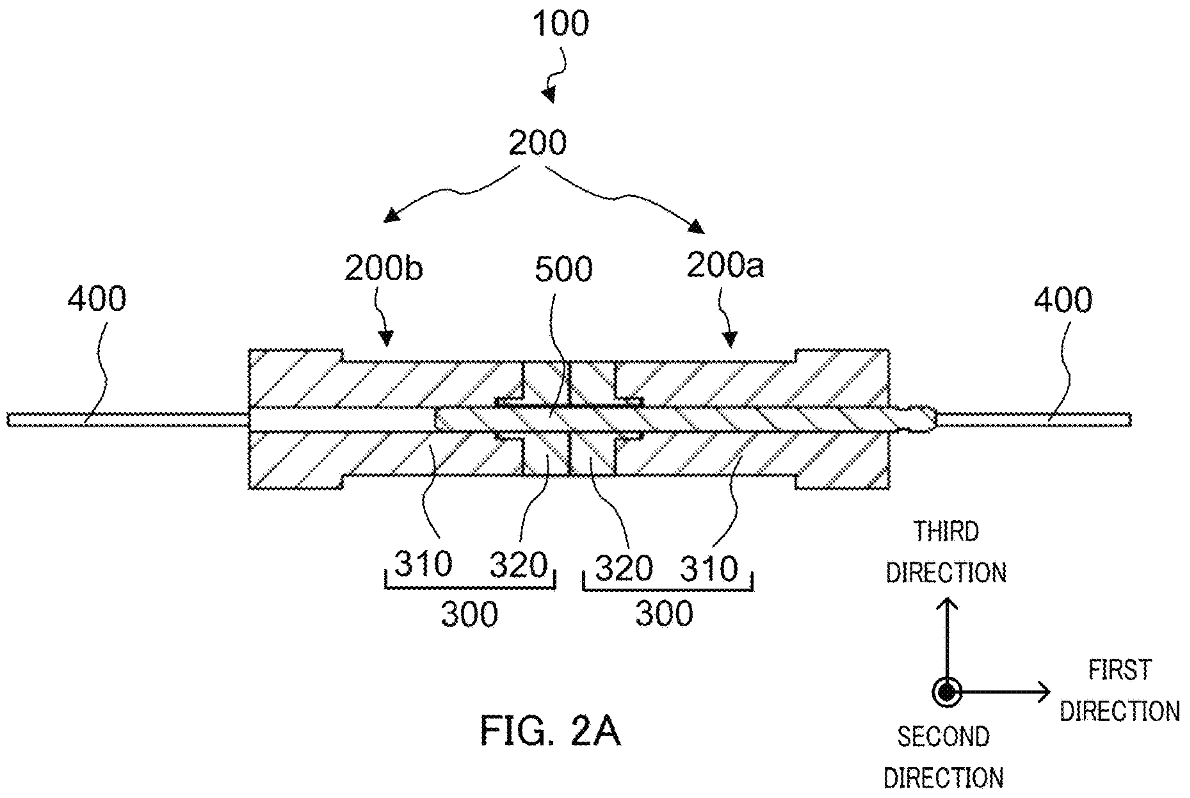
FIG. 2A is a sectional view of FIG. 1B.
Figure 2B:
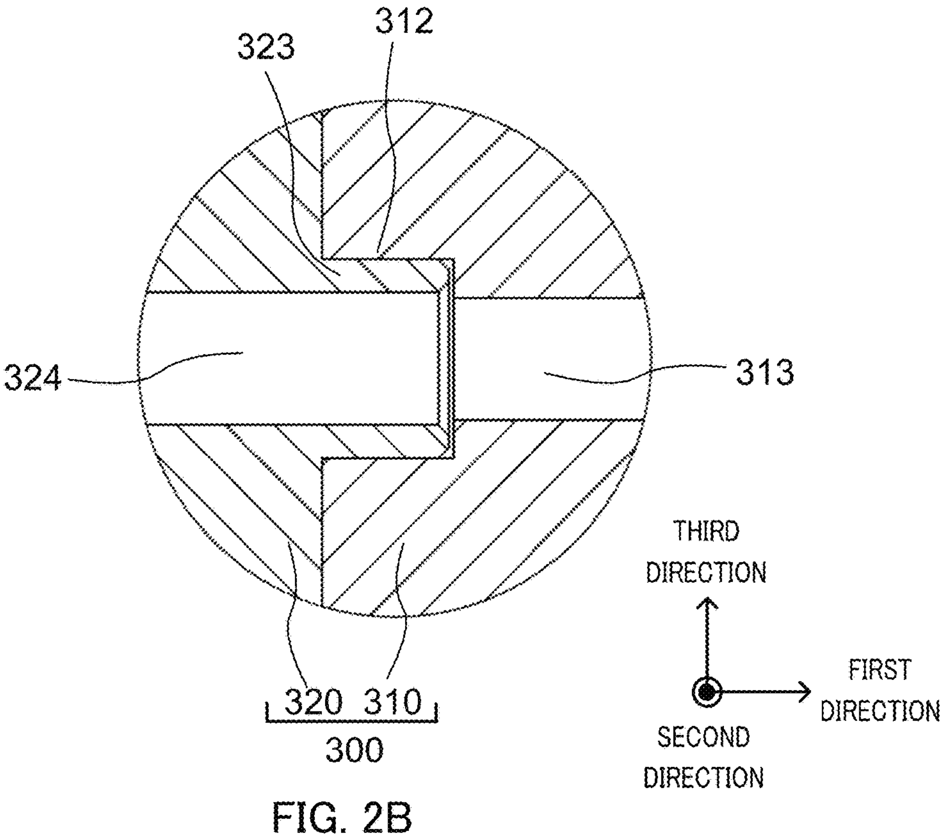
FIG. 2B is a partially enlarged view of FIG. 2A.

FIG. 2A is a sectional view taken along line A-A of FIG. 1B, and illustrates a state where two optical connectors 200 are connected to each other. FIG. 2B is a partially enlarged view of FIG. 2A. Note that coupling member 500 is omitted in FIG. 2B.

As illustrated in FIG. 2A, ferrule 300 of optical connector 200 includes ferrule body 310 that holds optical transmission member 400, and optical transmissive member 320 that transmits light from optical transmission member 400 or light to optical transmission member 400.

As illustrated in FIG. 2B, ferrule body 310 and optical transmissive member 320 become a single ferrule 300 when first fitting part 312 of ferrule body 310 and second fitting part 323 of optical transmissive member 320 are fitted and coupled with each other. Ferrule 300 holds an end portion of optical transmission member 400 and serves as optical connector 200.

As illustrated in FIG. 2A, two optical connectors 200 are disposed with their front surfaces facing each other and are connected through coupling member 500. Note that in the present embodiment, one of them is male optical connector 200*a*, and the other is female optical connector 200*b* (male and female are elaborated later). More specifically, as illustrated in FIG. 2B, in optical connector 200, first coupling hole 313 of ferrule body 310 and second coupling hole 324 of optical transmissive member 320 form a single coupling hole. When ferrules 300 are disposed with their front surfaces facing each other, the two coupling holes connected to each other. When a single coupling member 500 is received by the two holes connected to each other in the above-described manner, the two ferrules are connected to each other. Coupling member 500 is a guide pin, for example. The shape of the guide pin is a columnar shape, for example. It is preferable that the material of coupling member 500 have some strength in order to strongly connect the two ferrules. Examples of the material of coupling member 500 include metal.

Figure 3:
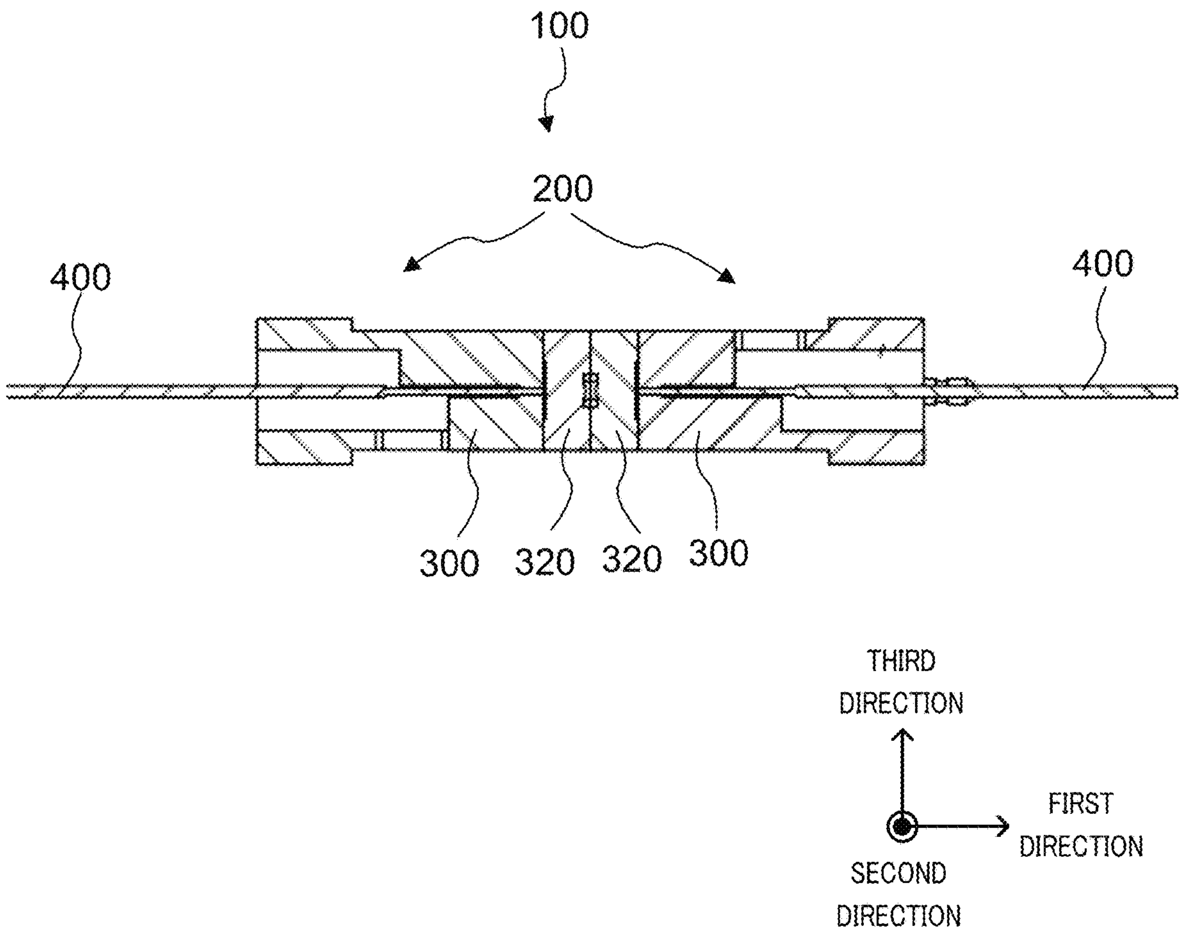
FIG. 3 is a sectional view of the optical connectors according to Embodiment 1 in a connected state.

FIG. 3 is a sectional view taken along line B-B of FIG. 1B. FIG. 3 illustrates a state where two ferrules are connected to each other in the above-described manner, and optical transmission members 400 of the respective ferrules optically connected to each other.

In the case where the left ferrule 300 in an optically connected state is the transmission side, light from the left optical transmission member 400 passes through optical transmissive member 320 of the left ferrule 300 and then through optical transmissive member 320 of the right ferrule so as to reach the right optical transmission member 400. Conversely, in the case where the right ferrule 300 is the transmission side, light from the right optical transmission member 400 passes through optical transmissive member 320 of the right ferrule and then through optical transmissive member 320 of the left ferrule 300 so as to reach the left optical transmission member 400.

Components

The components are described below.

Ferrule

As illustrated in FIG. 1A, ferrule 300 has a substantially cuboid shape. Ferrule 300 includes ferrule body 310, and optical transmissive member 320. Ferrule 300 is used for holding an end portion of optical transmission member 400 and optically connecting the front end surfaces of optical transmission members 400. Ferrule body 310 and optical transmissive member 320 are described below.

Ferrule Body

Figure 4A:
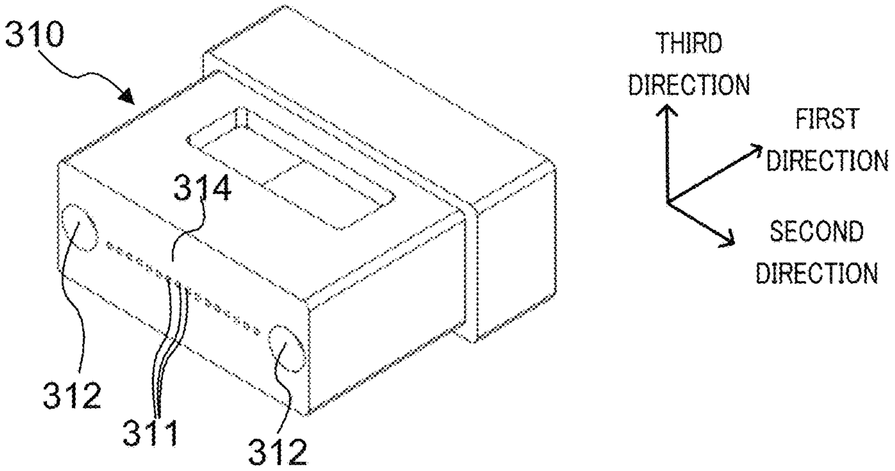
FIGS. 4A and 4B are perspective views of a ferrule body.
Figure 4B:
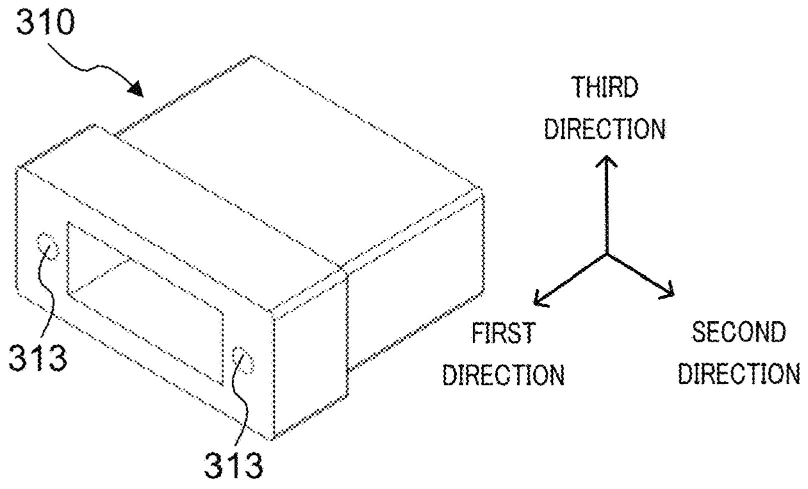
Figure 4C:
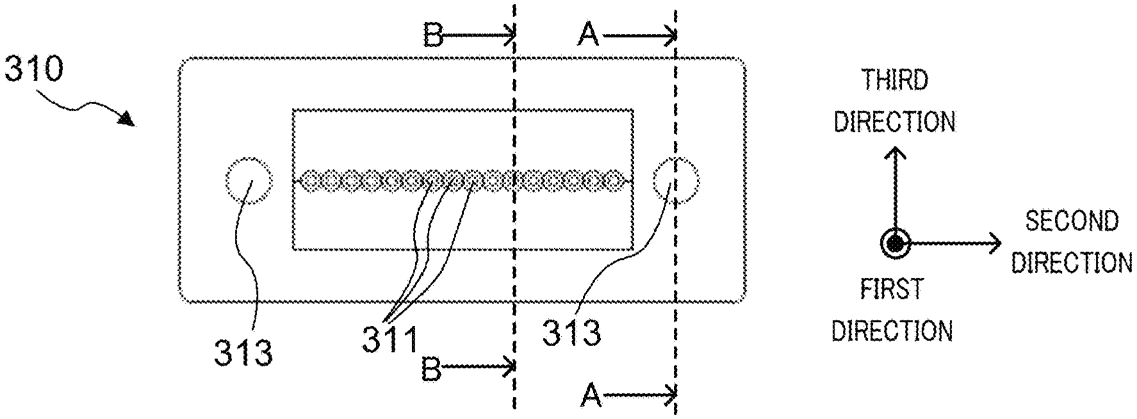
FIG. 4C is a rear view of the ferrule body.
Figure 5A:
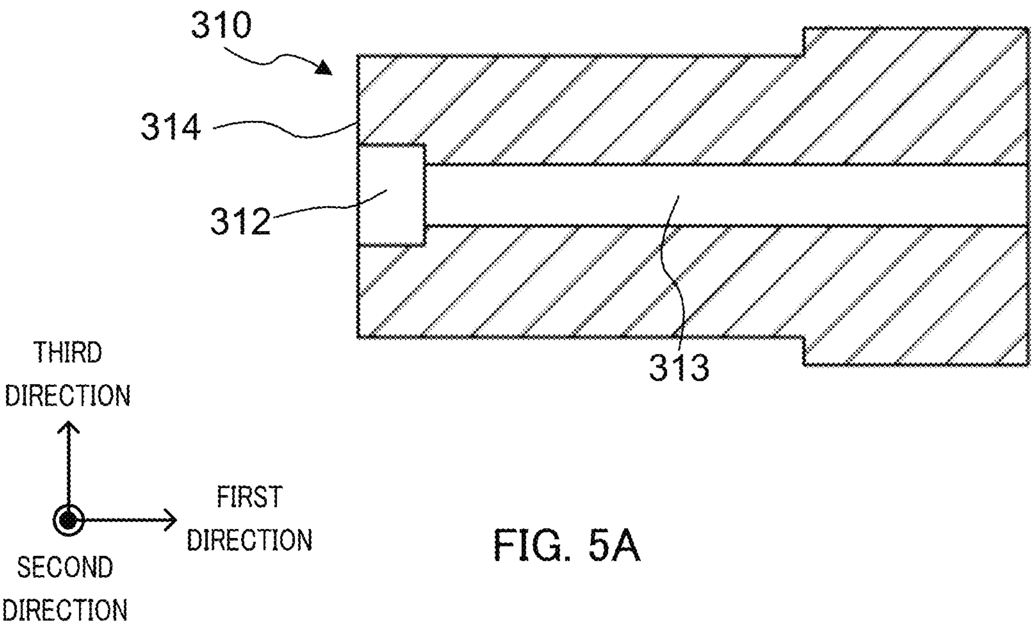
FIGS. 5A and 5B are sectional views of the ferrule body.
Figure 5B:
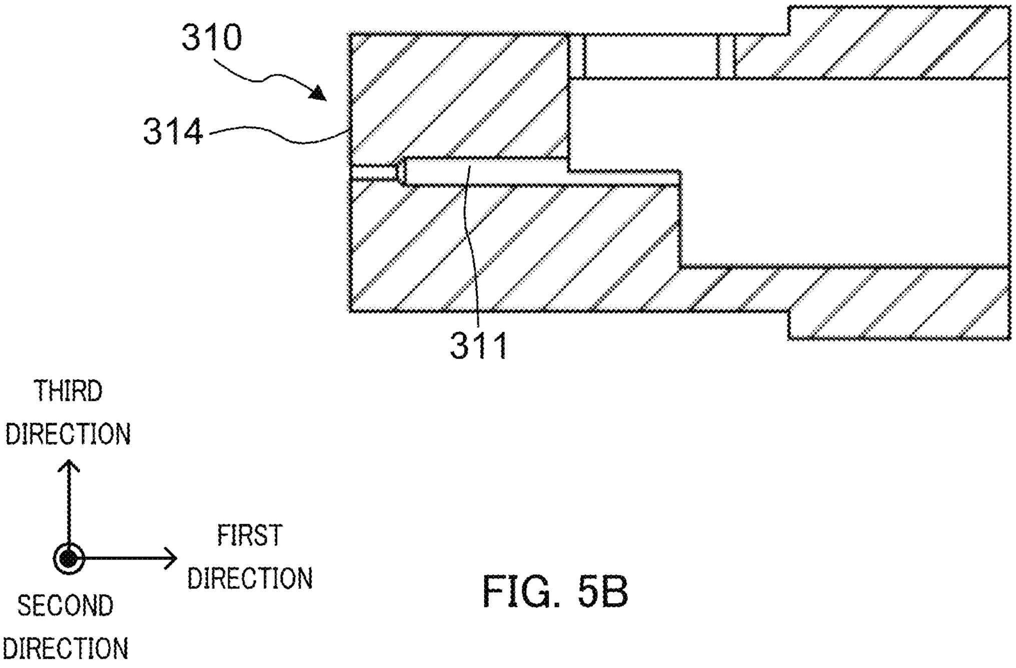

FIG. 4A is a perspective view of ferrule body 310 as viewed from the front surface side, FIG. 4B is a perspective view as viewed from the back side, FIG. 4C is a rear view, FIG. 5A is a sectional view taken along line A-A of FIG. 4C, and FIG. 5B is sectional view taken along line B-B.

Ferrule body 310 has a substantially cuboid shape. Ferrule body 310 is a portion for holding optical transmission member 400. Preferably, ferrule body 310 is molded with a heat resisting material. Examples of such a resin include poly phenyl sulfide resin (PPS). Note that poly phenyl sulfide resin may include glass.

Ferrule body 310 includes optical transmission member holding part 311, first fitting part 312, first coupling hole 313, and first surface 314. Each member is described below.

Optical transmission member holding part 311 holds optical transmission member 400. Optical transmission member holding part 311 is not limited as long as it can hold optical transmission member 400. In the present embodiment, as illustrated in FIG. 5B, optical transmission member holding part 311 is a plurality of through holes extending in the direction toward the front surface from the back surface of ferrule body 310 for receiving optical transmission member 400 (see also FIG. 4A). The number of the through holes may be appropriately set so that the plurality of optical transmission members 400 can be held. In the present embodiment, the number of the through holes is 16. In the case where optical transmission member holding part 311 is a plurality of through holes, the front end surface of optical transmission member 400 inserted in and protruded from the through holes is polished. In this manner, in the case where the surface facing optical transmissive member 320 when first fitting part 312 and second fitting part 323 are fitted with each other in ferrule body 310 is set as first surface 314, the region around a given optical transmission member 400 in first surface 314 and the front end surface of the given optical transmission member 400 are connected to each other with no step.

Optical transmission member holding part 311 may be a plurality of grooves. In the case where optical transmission member holding part 311 is a plurality of grooves, optical transmission member 400 is disposed in the grooves.

First fitting part 312 is fitted with second fitting part 323 of optical transmissive member 320 such that optical transmissive member 320 is disposed at ferrule body 310. The shape of first fitting part 312 is not limited as long as it has a complementary shape that can be fitted with second fitting part 323. In addition, the arrangement of first fitting part 312 is not limited as long as it is disposed at a corresponding position so that it can be fitted with second fitting part 323.

In the present embodiment, first fitting part 312 is a recess with an opening at the front surface of ferrule body 310. In addition, the recess has a circular shape in front view, and the recess has a cylindrical shape. In addition, in the present embodiment, first fitting part 312 is coaxial with first coupling hole 313 described later. In this manner, in the present embodiment, the opening of the coaxial first coupling hole 313 is disposed at the bottom of first fitting part 312, which is a recess as illustrated in FIG. 5A. Note that first fitting part 312 may be a protrusion, and second fitting part 323 may be a recess.

In addition, in the present embodiment, two first fitting parts 312 are disposed with a space therebetween in the second direction in the front surface of ferrule body 310. More specifically, in the present embodiment, two first fitting parts 312 are disposed in the front surface of ferrule body 310 in such a manner as to sandwich optical transmission member holding parts 311 disposed side by side in the second direction as illustrated in FIG. 4A.

First coupling hole 313 is a portion for receiving coupling member 500 and connecting the ferrules. First coupling hole 313 is not limited as long as coupling member 500 can be received and ferrules 300 can be connected. In the present embodiment, it suffices that first coupling hole 313 has a shape complementary to coupling member 500.

In the present embodiment, first coupling hole 313 may be a recess having an opening at the bottom of first fitting part 312, or may be a through hole having an opening at the bottom of first fitting part 312 and the back surface of the ferrule body. In the present embodiment, first coupling hole 313 is a through hole as illustrated in FIG. 5A. In addition, in the present embodiment, first coupling hole 313 may not be coaxial with first fitting part 312. In this case, first coupling hole 313 is a recess having an opening at the front surface (first surface 314) of the ferrule body, or a through hole having an opening at the front surface and the back surface of ferrule body 310.

In the present embodiment, as with first fitting part 312, two first coupling holes 313 are disposed with a space therebetween in the second direction as viewed from the front surface of ferrule body 310. In the present embodiment, at least two first coupling holes 313 are provided.

First surface 314 is a surface in ferrule body 310 that faces optical transmissive member 320 when optical transmissive member 320 is disposed at ferrule body 310 with first fitting part 312 and second fitting part 323 fitted with each other. In the present embodiment, first surface 314 is a flat surface on the front side in ferrule body 310. In addition, in the present embodiment, first surface 314 is parallel to the third direction.

Optical Transmissive Member

Figure 6A:
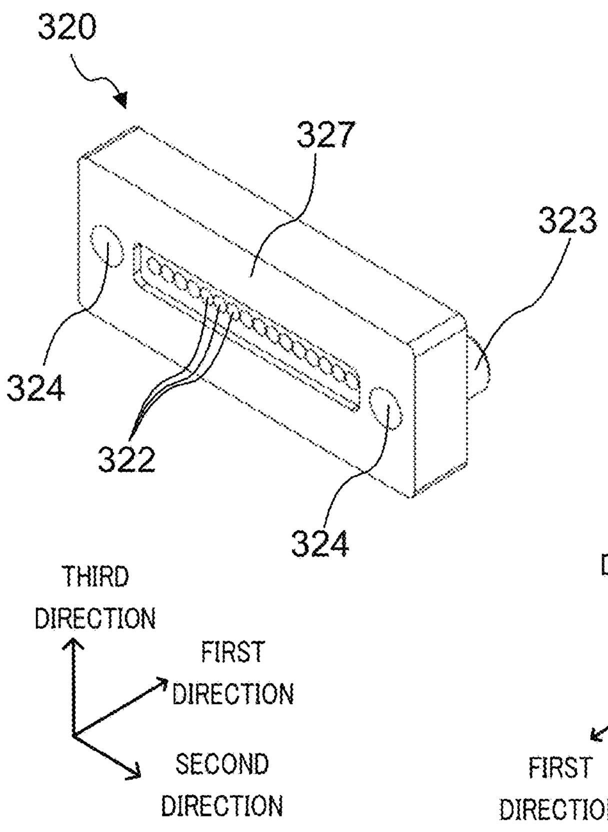
FIGS. 6A and 6B are perspective views of an optical transmissive member.
Figure 6B:
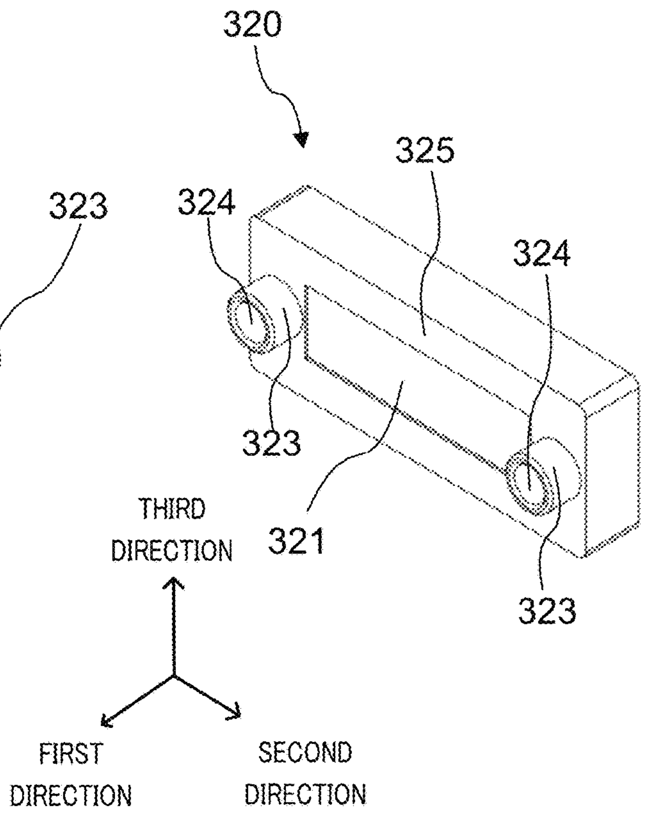
Figure 6C:
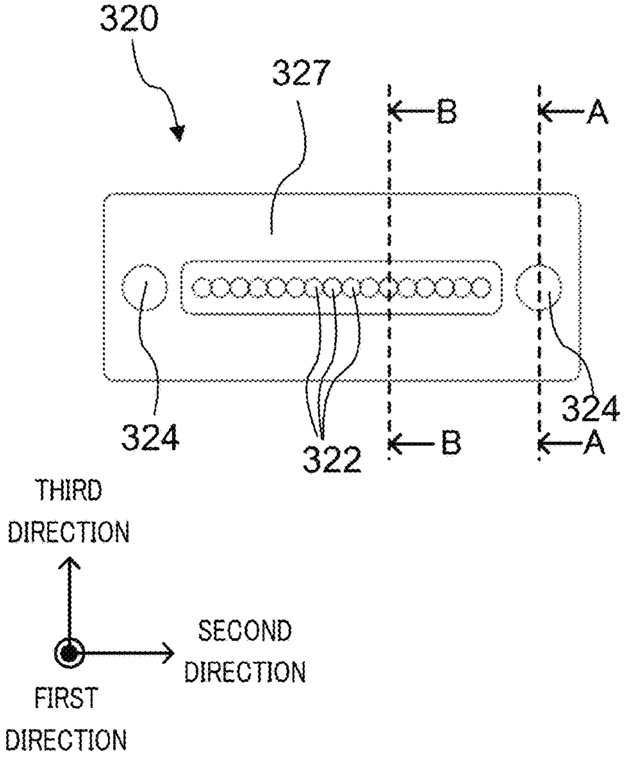
FIG. 6C is a front view.
Figure 6D:
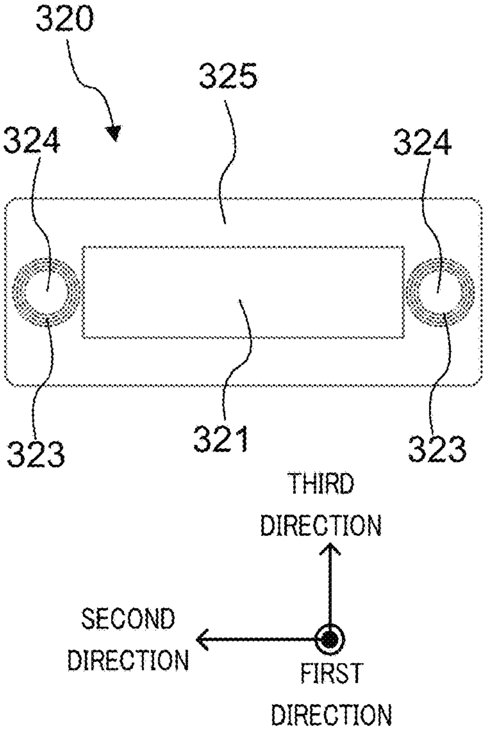
FIG. 6D is a rear view.
Figure 7A:
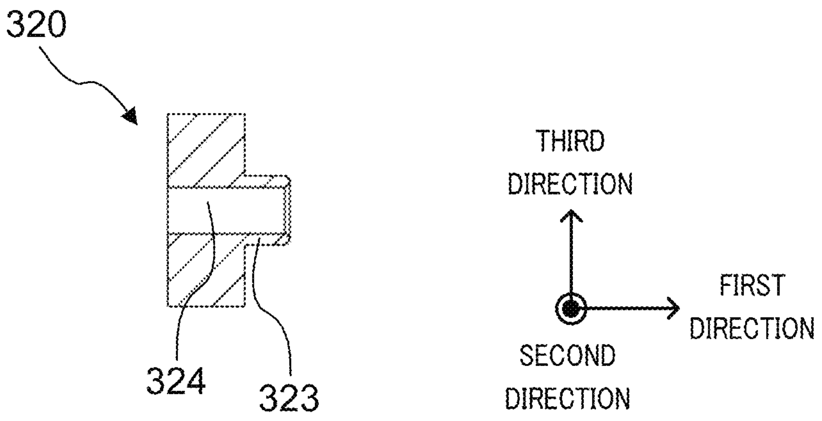
FIGS. 7A and 7B are sectional views of the optical transmissive member.
Figure 7B:
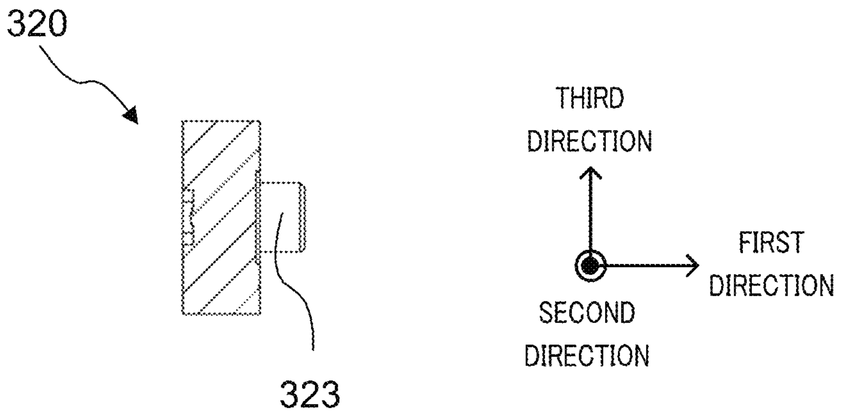

FIG. 6A is a perspective view of optical transmissive member 320 as viewed from the front side, FIG. 6B is a perspective view as viewed from the back side, FIG. 6C is a front view, FIG. 6D is a rear view, FIG. 7A is a sectional view taken along line A-A of FIG. 6C, and FIG. 7B is a sectional view taken along line B-B of FIG. 6C.

Optical transmissive member 320 is a member including an optical surface that transmits light from optical transmission member 400 held by ferrule body 310. Preferably, optical transmissive member 320 is molded with a heat resisting and optically transparent material. Examples of such a material include polyetherimide.

As illustrated in FIGS. 6A to 6D, optical transmissive member 320 includes first optical surface 321, second optical surface 322, second fitting part 323, second coupling hole 324, and second surface 325. Each member is described below.

First optical surface 321 is an optical surface that directly faces the front end surface of optical transmission member 400 held by ferrule body 310. First optical surface 321 is an optical surface for entering light from optical transmission member 400 held by ferrule body 310 and emitting light to optical transmission member 400, and first optical surface 321 is not limited as long as it is configured such that the above-described function can be provided. In the present embodiment, as illustrated in FIG. 6B, first optical surface 321 has a substantially rectangular shape elongated in the direction (second direction) in which the plurality of optical transmission members 400 are disposed side by side.

In addition, first optical surface 321 may be flush with second surface 325 described later or may be recessed from second surface 325. In the present embodiment, the first optical surface is at least one recess recessed from second surface 325.

The recess is a portion for preventing the contact of the front end surface of optical transmission member 400 with optical transmissive member 320. Specifically, in some situation optical transmission member 400 held by optical transmission member holding part 311 of ferrule body 310 slightly protrudes from the first surface. With the second surface provided with the recess (with first optical surface 321 provided with the recess), it is possible to prevent the protruding front end surface of optical transmission member 400 from making contact with optical transmissive member 320. Note that the recess may be filled with an adhesive. With the recess filled with an adhesive, the front end surface of optical transmission member 400 and the recess are joined to each other.

Second optical surface 322 is an optical surface disposed in third surface 327 disposed on the side opposite to first optical surface 321 in optical transmissive member 320. Second optical surface 322 is an optical surface for emitting light entered from first optical surface 321, and allowing incidence of light travelling toward optical transmission member 400. Second optical surface 322 is not limited as long as it is configured such that the above-described function can be provided. In the present embodiment, second optical surface 322 is an optical control surface, and collimates light emitted from optical transmission member 400, or light that enters optical transmission member 400. More specifically, in the present embodiment, second optical surface 322 is a plurality of convex lenses disposed side by side in the second direction.

Second fitting part 323 is fitted with first fitting part 312 of ferrule body 310 such that optical transmissive member 320 is disposed to ferrule body 310. The shape of second fitting part 323 is not limited as long as it has a complementary shape so that it can be fitted with first fitting part 312. In addition, the arrangement of second fitting part 323 is not limited as long as it is disposed at a corresponding position so that it can be fitted with first fitting part 312.

In the present embodiment, the external shape of second fitting part 323 is a shape of a protrusion protruding from the back surface (second surface 325) of optical transmissive member 320 as illustrated in FIG. 6B. In addition, the external shape of the protrusion is a columnar shape as illustrated in FIG. 6B.

In addition, in the present embodiment, second fitting part 323 is coaxial with second coupling hole 324 described later as illustrated in FIG. 6B. In this manner, in the present embodiment, second fitting part 323 is a protrusion with second coupling hole 324 extending through its center. More specifically, in the present embodiment, second fitting part 323 has a columnar shape with a through hole (or an annular shape (ring shape) with the inner peripheral surface and the outer peripheral surface).

Note that second fitting part 323 may not be coaxial with second coupling hole 324. In this case, second fitting part 323 has a columnar shape with no through hole.

In addition, in the present embodiment, two second fitting parts 323 are disposed with a space therebetween in the second direction at the back surface (second surface 325) of optical transmissive member 320. More specifically, as illustrated in FIG. 6B, two second fitting parts 323 are disposed with first optical surface 321 sandwiched therebetween.

Second coupling hole 324 is a portion for receiving coupling member 500 and connecting the ferrules. Second coupling hole 324 is not limited as long as it can receive coupling member 500 and connect the ferrules. In the present embodiment, it suffices that second coupling hole 324 has a shape complementary to coupling member 500. In addition, it suffices that it is disposed at a position corresponding to the first coupling hole so that it can connect to second coupling hole 324 and first coupling hole and receive coupling member 500. More specifically, in the present embodiment, second coupling holes 324 are disposed on both sides with second optical surface 322 sandwiched therebetween. In addition, in the present embodiment, at least two second coupling holes 324 are provided.

In the present embodiment, second coupling hole 324 is a through hole that is open at both the front surface (third surface 327) and the back surface (second surface 325) of optical transmissive member 320. In addition, in the present embodiment, second coupling hole 324 has a columnar shape so as to be complementary to the shape of coupling member 500, which is a coupling pin. In addition, in the present embodiment, the opening of first coupling hole 313 has a circular shape, and second coupling hole 324 has a cylindrical shape with a diameter greater than the diameter of that opening. This prevents the damage to optical transmissive member 320 due to coupling member 500, and the generation of debris.

Second coupling hole 324 may be or may not be coaxial with second fitting part 323. In the present embodiment, second coupling hole 324 is coaxial with second fitting part 323. Therefore, second coupling hole 324 passes through the center of second fitting part 323 with the cylindrical shape.

Second surface 325 is a surface in optical transmissive member 320 that faces ferrule body 310 when optical transmissive member 320 is disposed at ferrule body 310 with second fitting part 323 and first fitting part 312 fitted with each other. Second surface 325, which is a flat surface in the present embodiment, is disposed at the back surface of optical transmissive member 320. In addition, in the present embodiment, second surface 325 is parallel to the third direction.

Assembling Procedure

An assembling procedure for optical connector 200 is described below.

First, optical transmission member 400 is held at optical transmission member holding part 311 of ferrule body 310 and fixed by using adhesive or the like. Next, the front end surface of optical transmission member 400 protruding from the front surface of ferrule body 310 is polished. Next, first fitting part 312 and second fitting part 323 are fitted with each other so as to dispose optical transmissive member 320 at ferrule body 310 and obtain optical connector 200.

In the state where the front surfaces of two ferrules 300 (two optical connectors 200) obtained in the above-described manner face each other, coupling member 500 is inserted to one coupling hole formed with two first coupling holes 313 and two second coupling holes 324, and thus two optical connectors 200 are connected to each other.

Effects

With ferrule 300 according to the present embodiment, the two members can be coupled with each other by using first fitting part 312 and second fitting part 323, and, with first coupling hole 313 and second coupling hole 324, two ferrules 300 with the same shape can be connected to each other by inserting coupling member 500.

Embodiment 2

Figure 8A:
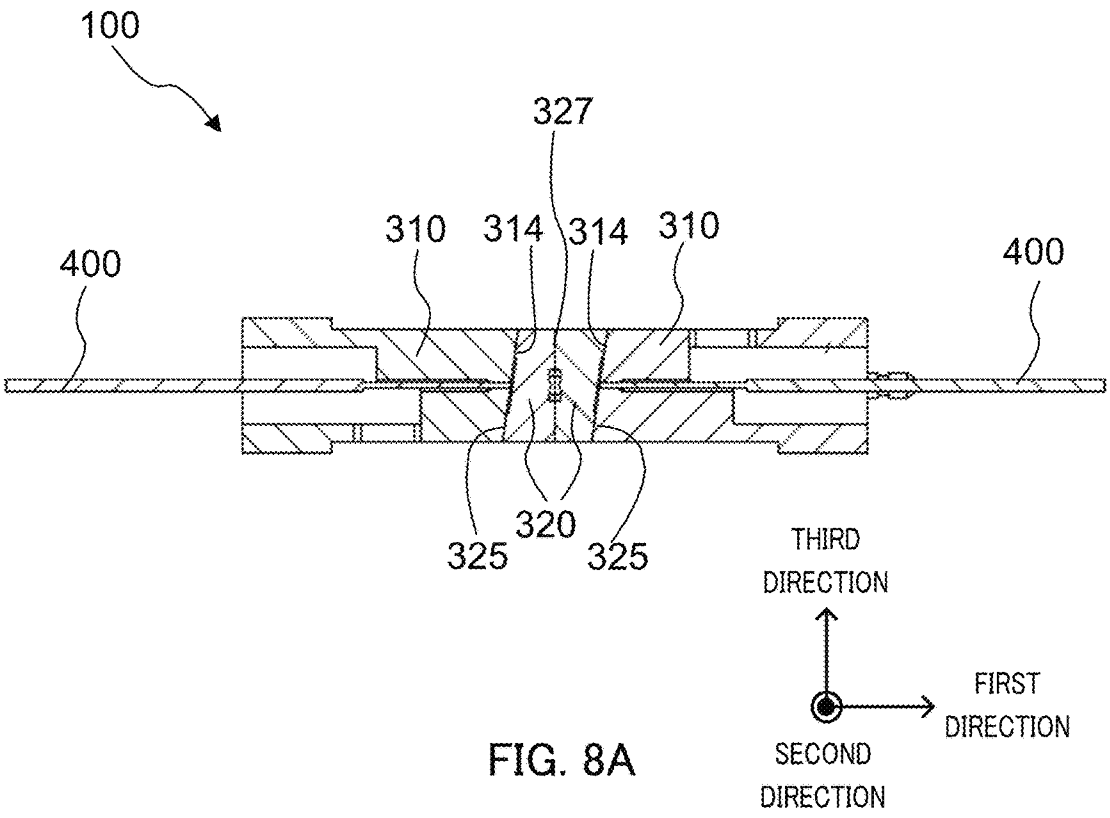
FIGS. 8A and 8B are sectional views of an optical connector according to Embodiment 2.
Figure 8B:
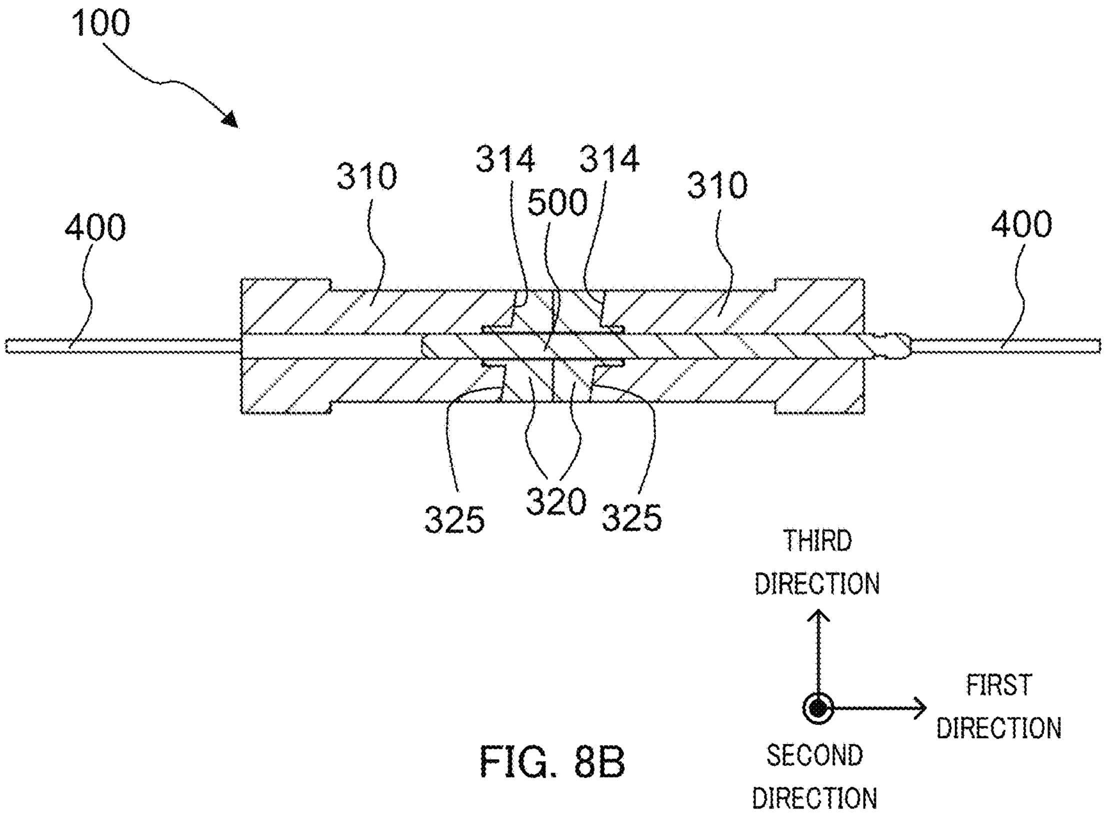

FIGS. 8A and 8B are sectional views illustrating optical connector 200 according to Embodiment 2 in a connected state. More specifically, FIG. 8A is a sectional view illustrating a state where optical transmission members 400 of two optical connectors are optically connected to each other, and FIG. 8B illustrates a state where two optical connectors 200 are connected to each other through coupling member 500.

As is clear from FIGS. 8A and 8B, when the surfaces facing each other in ferrule body 310 and optical transmissive member 320 are set as first surface 314 and second surface 325, respectively in optical connector module 100 according to Embodiment 2, first surface 314 and second surface 325 are tilted with respect to the third direction. The other configurations are similar to those of Embodiment 1. In the present embodiment, first surface 314 and second surface 325 are tilted at an angle of 8 degrees with respect to the third direction.

With second surface 325 tilted with respect to the third direction, light emitted from optical transmission member 400 is refracted by second surface 325. In this manner, it is possible to prevent a situation where light emitted from optical transmission member 400 is Fresnel reflected and partially returned to optical transmission member 400.

Note that only one of first surface 314 and second surface 325 may be tilted. In addition, it is preferable that the space between first surface 314 and second surface 325 be filled with an adhesive. In addition, in the present embodiment, third surface 327 is parallel to the third direction.

Effects

With optical connector module 100 according to Embodiment 2, the reduction in light coupling efficiency can be suppressed with the tilted first surface 314 and second surface 325.

Embodiment 3

Figure 9A:
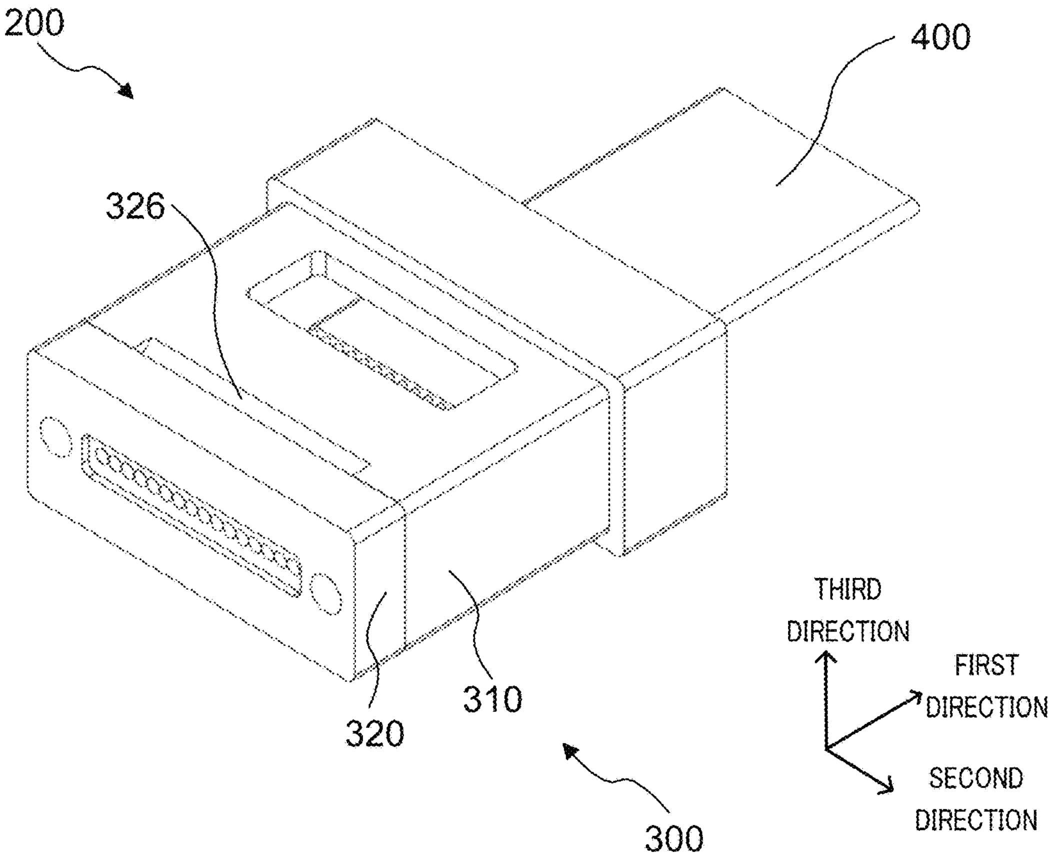
FIG. 9A is a perspective view of an optical connector according to Embodiment 3.
Figure 9B:
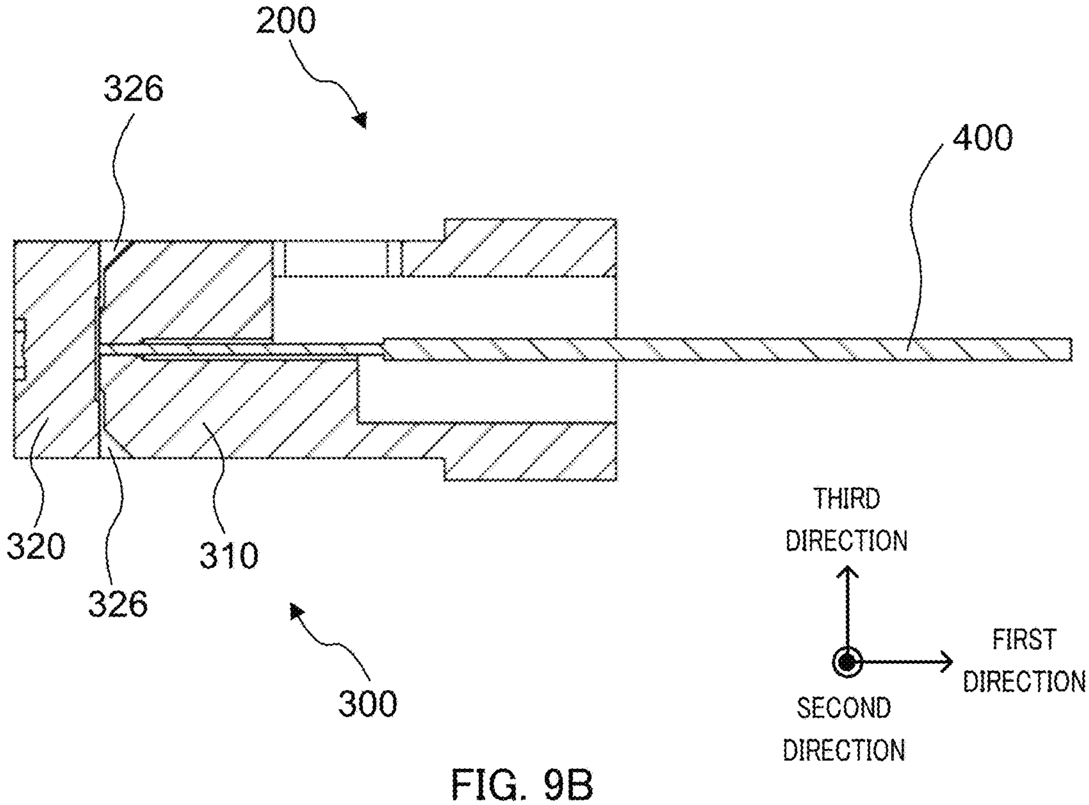
FIG. 9B is a sectional view of the optical connector according to Embodiment 3.

FIG. 9A is a perspective view of optical connector 200 according to Embodiment 3, and FIG. 9B is a sectional view of optical transmission member 400.

As illustrated in FIGS. 9A and 9B, in optical connector 200 according to Embodiment 3, ferrule 300 includes adhesive inlet groove 326 for supplying adhesive between ferrule body 310 (the front surface of ferrule body 310) and optical transmissive member 320 (the back surface of optical transmissive member 320). The other configurations of Embodiment 3 are similar to those of Embodiment 1. The opening of adhesive inlet groove 326 may be provided at one or both of the flat surfaces of ferrule 300 perpendicular to the third direction. In the present embodiment, the opening of adhesive inlet groove 326 is disposed at both of them. In addition, in the present embodiment, as illustrated in FIG. 9A, the opening of adhesive inlet groove 326 is a groove extending in the second direction.

Adhesive inlet groove 326 is not limited as long as adhesive can be supplied between the front surface of ferrule body 310 and the back surface of optical transmissive member 320. In the present embodiment, adhesive inlet groove 326 includes an opening disposed at the surface of ferrule 300 perpendicular to the third direction, and a groove formed between the front surface of ferrule body 310 and the back surface of optical transmissive member 320.

Effects

Ferrule 300 in optical connector 200 according to Embodiment 3 includes adhesive inlet groove 326. In this manner, ferrule body 310 and optical transmissive member 320 can be fixed by using adhesive.

Embodiment 4

Figure 10A:
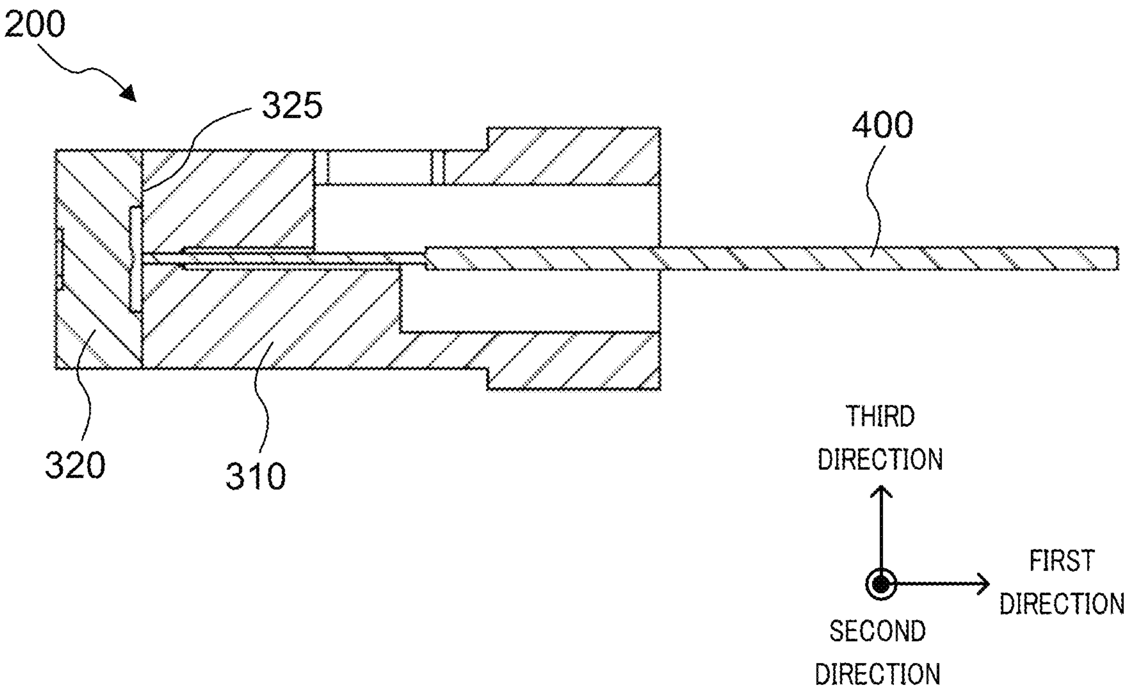
FIG. 10A is a sectional view of optical connector 200 according to Embodiment 4.
Figure 10B:
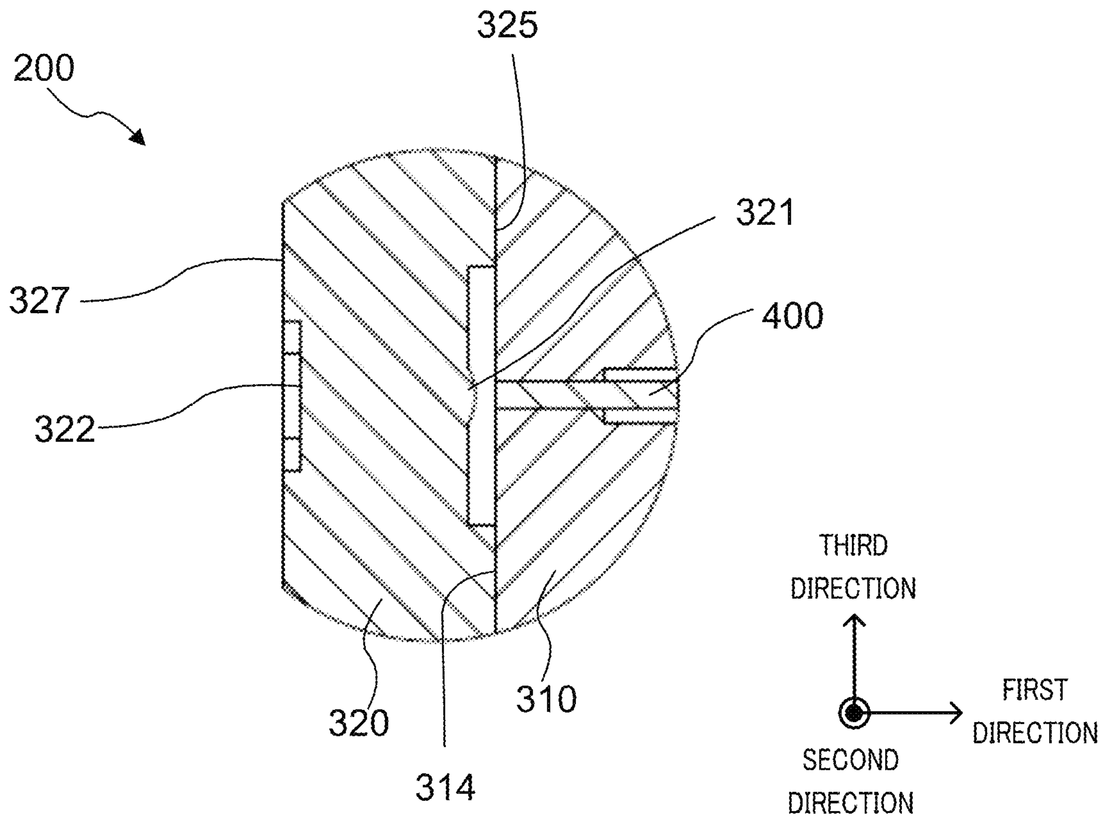
FIG. 10B is a partially enlarged view of FIG. 10A.

FIG. 10A is a sectional view illustrating optical connector 200 according to Embodiment 4, and FIG. 10B is a partially enlarged view of FIG. 10A.

Optical connector 200 according to Embodiment 4 is different from the optical connector of Embodiment 1 in that first optical surface 321 of second surface 325 of optical transmissive member 320 is an optical control surface.

The optical control surface collimates light emitted from optical transmission member 400, or light that enters optical transmission member 400. More specifically, in the present embodiment, the optical control surface is a plurality of convex lenses disposed side by side in the second direction.

Note that in the present embodiment, no adhesive is provided but a gap (air) is provided, between first surface 314 of ferrule body 310 and second surface 325 of optical transmissive member 320 (between the front end surface of optical transmission member 400 and the optical control surface). This provides a refractive index difference, and thus light incident on the optical control surface and light emitted from the optical control surface can be collimated. In addition, in the present embodiment, second optical surface 322 of third surface 327 is a flat surface. Second optical surface 322 of third surface 327 may be an inclined surface, instead of a flat surface.

Effects

In the present embodiment, first optical surface 321 of second surface 325 is an optical control surface. This makes it possible to collimate light emitted from optical transmission member 400 or light that enters optical transmission member 400.

Male and Female Optical Connectors

Figure 11A:
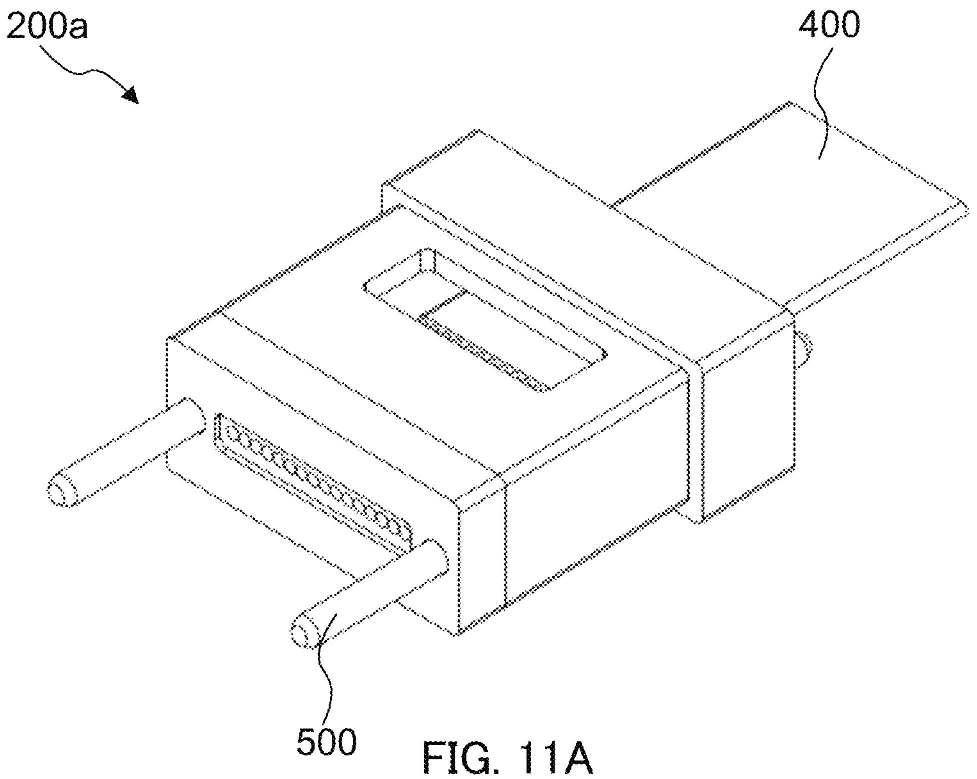
FIG. 11A is a perspective view of a male optical connector, and FIG. 11B a sectional view.
Figure 11B:
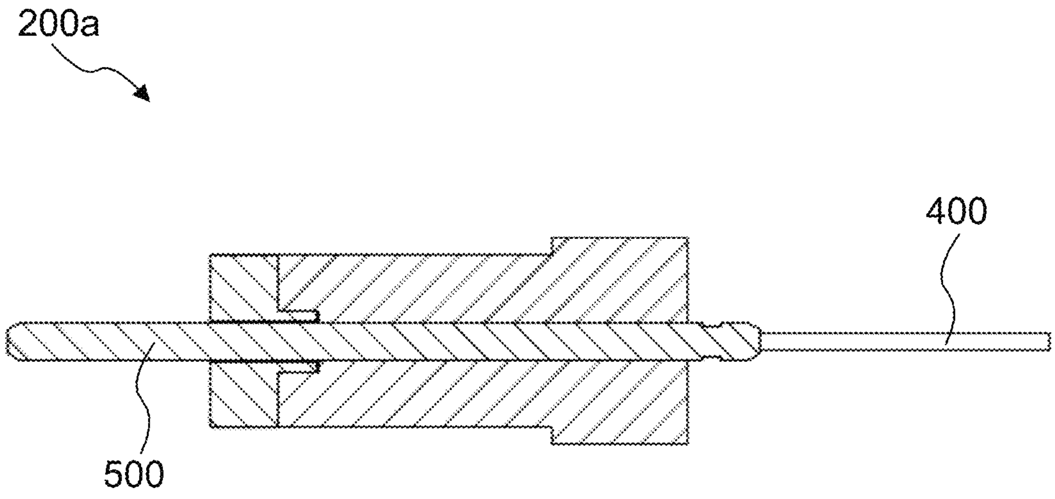

FIG. 11A is a perspective view of male optical connector 200*a*, and FIG. 11B is a sectional view. In male optical connector 200*a*, coupling member 500 is protruded from the front surface of optical connector 200, as a protruding structure.

Figure 12A:
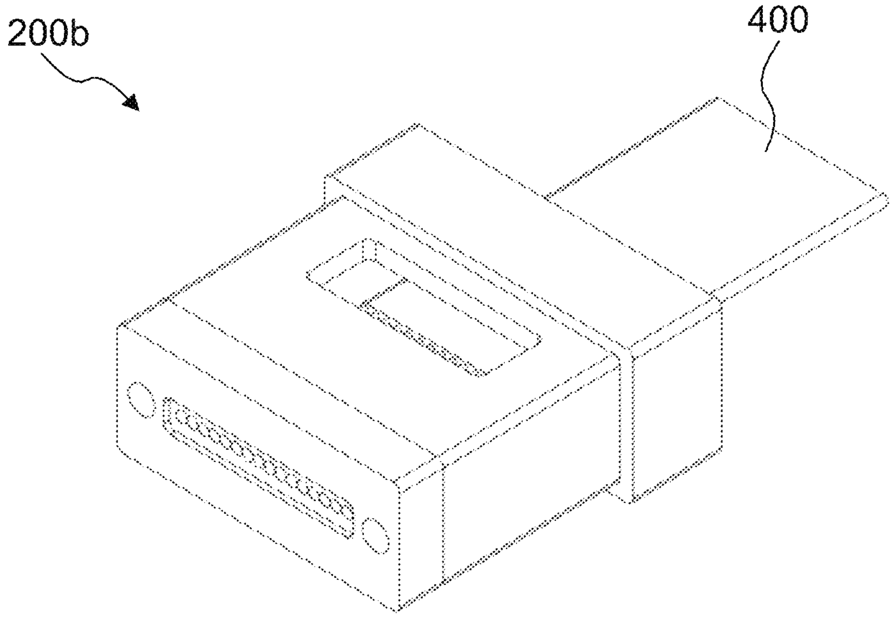
FIG. 12A is a perspective view of a female optical connector.
Figure 12B:
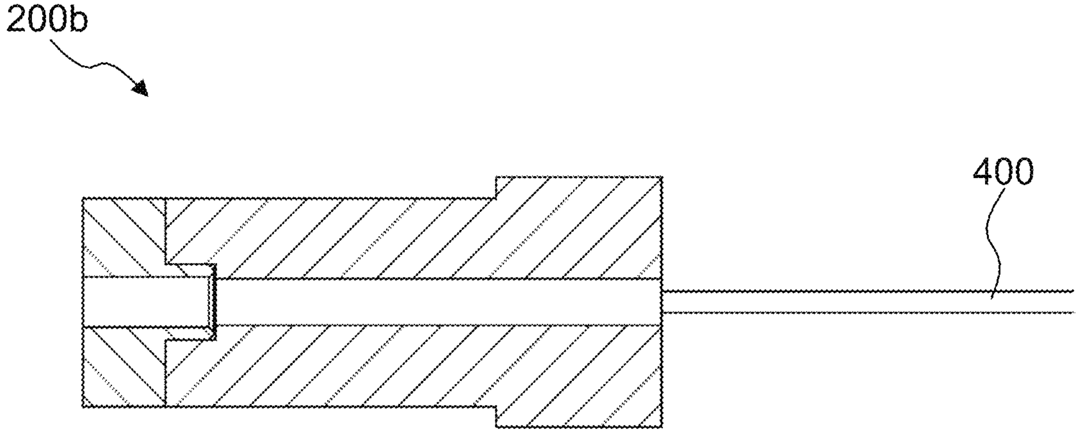
FIG. 12B is a sectional view.

FIG. 12A is a perspective view of female optical connector 200*b*, and FIG. 12B is a sectional view. In female optical connector 200*b*, no coupling member is inserted, and a recessed structure is provided at the front surface of optical connector 200*b*.

Optical connectors 200 can be connected to each other with the front surfaces of the above-described male optical connector 200*a* and female optical connector 200*b* fitted with each other. Note that optical connectors 200*a* and 200*b* may be provided as optical connector module 100 by being combined with a housing, a spring structure and the like not illustrated in the drawing.

INDUSTRIAL APPLICABILITY

The ferrule, the optical connector and the optical connector module according to the present invention are suitable for optical communications using optical transmission members.

REFERENCE SIGNS LIST

100 Optical connector module
200 Optical connector
200*a* Male optical connector
200*b* Female optical connector
300 Ferrule
310 Ferrule body
311 Optical transmission member holding part
312 First fitting part
313 First coupling hole
314 First surface
320 Optical transmissive member
321 First optical surface
322 Second optical surface
323 Second fitting part
324 Second coupling hole
325 Second surface
326 Adhesive inlet groove
327 Third surface
400 Optical transmission member
500 Coupling member

The invention claimed is:

1. A ferrule, comprising:

a ferrule body including an optical transmission member holding part, the optical transmission member holding part being configured to hold a plurality of optical transmission members; and an optical transmissive member including an optical surface disposed opposite to front end surfaces of the plurality of optical transmission members held by the optical transmission member holding part, the optical transmissive member being configured to transmit light emitted from the plurality of optical transmission members or light that enters the plurality of optical transmission members, wherein the ferrule body includes a first fitting part and a first coupling hole, the first coupling hole being configured to receive a coupling member, wherein the optical transmissive member includes a second fitting part configured to be fitted with the first fitting part, and a second coupling hole through which the coupling member received by the first coupling hole is provided, wherein the first fitting part and the first coupling hole are coaxial, wherein the second fitting part and the second coupling hole are coaxial, and wherein the first fitting part is a recess and the second fitting part is a protrusion, or the first fitting part is a protrusion and the second fitting part is a recess.

2. The ferrule according to claim 1, wherein the coupling member is a guide pin.

3. The ferrule according to claim 1, wherein the first coupling hole includes at least two first coupling holes, wherein the second coupling hole includes at least two second coupling holes, and wherein the at least two second coupling holes are disposed on both sides with the optical surface sandwiched between the at least two second coupling holes.

4. The ferrule according to claim 1, wherein the optical transmission member holding part is a plurality of through holes.

5. The ferrule according to claim 1, wherein when surfaces facing each other of the ferrule body and the optical transmissive member are a first surface and a second surface, respectively, and when the first fitting part and the second fitting part are fitted with each other, a plurality of optical control surfaces configured to collimate light emitted from the plurality of optical transmission members or light that enters the plurality of optical transmission members is provided in the second surface.

6. The ferrule according to claim 1, wherein a plurality of optical control surfaces configured to collimate light emitted from the plurality of optical transmission members or light that enters the plurality of optical transmission members is provided in a third surface disposed on a side opposite to a surface that faces the ferrule body in the optical transmissive member when the optical transmissive member is disposed at the ferrule body.

7. The ferrule according to claim 1, wherein an opening of the first coupling hole has a circular shape, and wherein the second coupling hole has a cylindrical shape with a diameter greater than a diameter of the opening.

8. The ferrule according to claim 1, wherein the first fitting part is the recess, and wherein the second fitting part is the protrusion.

9. The ferrule according to claim 1, wherein when an extending direction of the plurality of optical transmission members is a first direction, a direction in which the plurality of optical transmission members is disposed is a second direction, a direction perpendicular to the first direction and the second direction is a third direction, and when the first fitting part and the second fitting part are fitted with each other, surfaces facing each other of the ferrule body and the optical transmissive member are a first surface and a second surface, respectively, the first surface and the second surface are tilted with respect to the third direction.

10. The ferrule according to claim 1, wherein when surfaces facing each other of the ferrule body and the optical transmissive member are a first surface and a second surface, respectively, and when the first fitting part and the second fitting part are fitted with each other, the second surface includes a first optical surface that is at least one recess disposed at a position opposite to the front end surfaces of the plurality of optical transmission members.

11. The ferrule according to claim 1, wherein the ferrule body and the optical transmissive member are fixed to each other with an adhesive.

12. The ferrule according to claim 10, wherein the recess is filled with an adhesive.

13. The ferrule according to claim 1, wherein the first coupling hole is a through hole.

14. An optical connector, comprising:

the ferrule according to claim 1; and a plurality of optical transmission members.

15. The optical connector according to claim 14, further comprising a coupling member.

16. The optical connector according to claim 14, wherein when a surface in the ferrule body that faces the optical transmissive member is a first surface when the first fitting part and the second fitting part are fitted with each other, a region around a given optical transmission member in the first surface and a front end surface of the given optical transmission member are connected to each other with no step.

17. The optical connector according to claim 14, wherein the first coupling hole includes two first coupling holes, wherein the second coupling hole includes two second coupling holes, and wherein the optical connector further comprises one coupling member.

18. A female optical connector module, comprising the optical connector according to claim 14.

19. A male optical connector module, comprising the optical connector according to claim 15.

* * * * *